June 15, 1937.  J. C. PARKINSON  2,084,107
DOUBLE WINDOW CONSTRUCTION
Filed Sept. 6, 1935

INVENTOR.
JOSEPH C. PARKINSON
BY
ATTORNEYS.

Patented June 15, 1937

2,084,107

UNITED STATES PATENT OFFICE 2,084,107

DOUBLE WINDOW CONSTRUCTION

Joseph Carl Parkinson, Tarentum, Pa., assignor to Pittsburgh Plate Glass Company, Allegheny County, Pa., a corporation of Pennsylvania Application September 6, 1935, Serial No. 39,425

2 Claims. (Cl. 20—56.5)

The invention relates to double glazed windows and particularly to the mounting thereof. It has for its principal objects the provision of a mounting of the channel type which can be easily applied to the glass sheets with the necessary pressure to maintain the sealing means under proper compression without injury to the yielding strips on the inner sides of the flanges of the channel. Heretofore this has presented a serious difficulty in connection with the channel type of frame. A further object is the provision of a channel of the desired weight and stiffness having the weather resisting characteristics of expensive metal, such as stainless steel, but of relatively low cost due to the fact that the body of the channel is of ordinary steel or other cheap metal. One embodiment of the invention is shown in the accompanying drawing, wherein:

Figure 3:
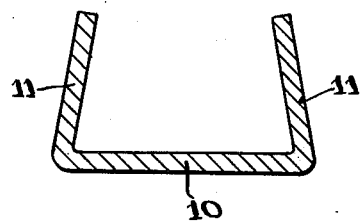
Figure 3:
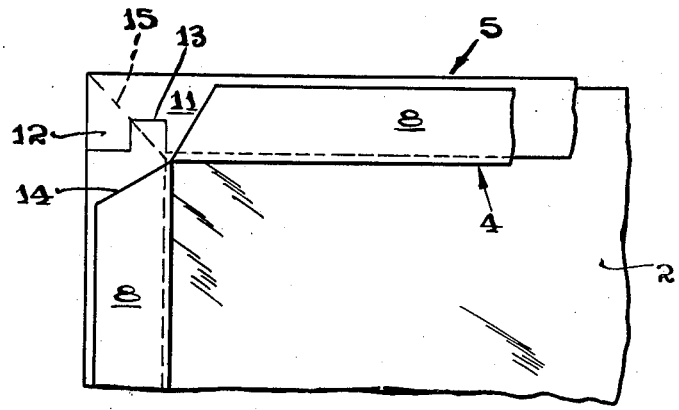

And Fig. 3 is a side elevation of one corner of the assembled unit.

Referring to the drawing, 1 and 2 are the glass sheets which make up the unit, and 3 is a spacer around the margin of the sheets, such spacer preferably being of rubber or other yielding material which may be compressed and which will make a seal with the surfaces of the glass sheets. The frame of the unit to which the invention particularly relates is made up of interfitting channels 4 and 5 of sheet metal. Each side of the unit is provided with a pair of these channels which are interlocked at the corners in any suitable manner, but preferably as shown in Fig. 3 and later described.

Figure 2:
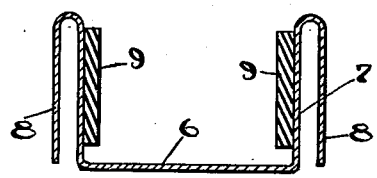
Fig. 2 is a section through the channels used in the unit preliminary to assembling them, the size and thickness of materials throughout being much exaggerated for clearness of illustration.

The channel 4 preferably is made of thin stainless steel (nickel chromium iron alloy) or other suitable corrosion resisting metal. This metal is preferably about .005 of an inch in thickness and because of its lightness is relatively inexpensive even though the metal itself is relatively costly. This channel is formed, as indicated in Fig. 2, and comprises a base 6 and a double flange 7, 8 at each side, bent in such manner as to form a slot or pocket for the reception of the flanges of the channel 5, as later described. The flanges 7 and 8 which oppose the glass sheets are provided on their inner faces with strips of yielding sealing material 9, such as rubber or the like. Because of the light, springy character of the channel, it may be slipped into position over the edge of the glass sheets without injury to the sealing strips, such as often occurs when such sealing strips are applied to a stiff heavy channel and slipped over the edges of glass sheets.

Figure 1:
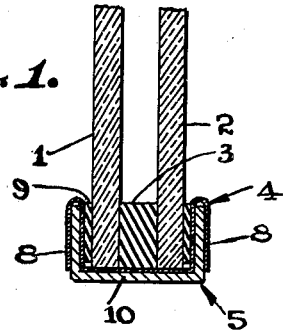
Figure 1 is a section through one edge of a unit.

In order to reinforce the channel 4 and give the necessary compression on the sealing members 3 and 9, the channel 5 is employed. This is made of much thicker material than the channel 4 and is preferably of steel having considerable temper and about .025 of an inch in thickness. It comprises a base 10 and a pair of flanges 11, which before application to the unit are inclined toward each other, as indicated in Fig. 2. When this channel is slipped into position with its flanges 11, 11 in the slots between the flanges 7 and 8 of the channel 4, the flanges 11 are brought into substantial parallelism, as indicated in Fig. 1, and apply yielding pressure to the edge of the unit, thus compressing the sealing members 3 and 9 and insuring tight joints between such members and the glass surfaces.

This channel 5 gives the unit its necessary strength and rigidity and is made of metal, which is relatively cheap as compared with the metal of the channel 4. In service this channel 5 is protected from the weather by the flanges 8, 8 of the channel 4 and by the sash in which the unit is set so that the mounting as a whole is weather and corrosion resisting due to the alloy of which the channel 4 is composed. The channels are preferably secured together at the corners of the unit by the means shown in Fig. 3, although any suitable form of locking means may be used. The locking means shown forms the subject matter of the pending application of C. E. Stroud, Serial No. 29,696, filed July 3, 1935. No claim is made herein to the details of this construction involving the interlocking lugs.

As shown in Fig. 3, the flanges of the channels 5 are provided with interfitting lugs 12 and 13 which snap into interengagement when the parts are assembled. In order to expose this locking joint and permit the ready interlocking of the parts, the outer flanges 8, 8 of the channels 4 are cut away at the corners, as indicated at 14 in Fig. 3. The inner flanges 7, 7 of the channels 4 which carry the sealing strips 9, 9 are not cut away, but come together along the line 15 shown in dotted lines in Fig. 3. The mounting as above described, and as illustrated, is weather resistant, but at the same time is not high in cost due to the fact that the channels 4 are light and thin, but at the same time the mounting is strong and rigid due to the use of the reinforcing channels 5. After the channels 4 are in position, the channels 5 may be slipped into position, placing the sealing strips and spacers under compression without any injury to the sealing strips, thus overcoming the difficulty in this connection heretofore pointed out and present when a heavy channel is used carrying the sealing strips on its flanges. Other advantages incident to the construction will be readily apparent to those skilled in the art.

What I claim is:

1. In a double window construction, a pair of spaced glass sheets with spacing and sealing means between their margins, a channel of light sheet metal fitting around the edges of the sheets and having its flanges which oppose the faces of the glass sheets bent back upon themselves in parallel with the glass sheets so as to form slots, sealing material on the faces of the flanges next to the glass sheets, and a second reinforcing channel fitting over the first channel with its flanges in said slots and adapted to apply compression to the spacing means and to said sealing material.

2. In a double window construction, a pair of spaced glass sheets with spacing and sealing means between their margins, a channel of light, corrosion-resisting sheet metal fitting around the edges of the sheets and having its flanges which oppose the faces of the glass sheets bent back on themselves in parallel with the glass sheets so as to form slots, sealing material on the faces of the flanges next to the glass sheets, and a second reinforcing channel of steel nesting with the first channel with its flanges in said slots and adapted to apply compression to the spacing means and to said sealing material.

JOSEPH CARL PARKINSON.